US012274393B2

(12) United States Patent
Ben-David et al.

(10) Patent No.: US 12,274,393 B2
(45) Date of Patent: Apr. 15, 2025

(54) AIR FRYER WITH VIBRATING OR ROTATING POT AND INDUCTION COOKING UNIT FOR ROBOTIC AND AUTOMATED FOOD PREPARATION SYSTEMS

(71) Applicant: Kitchen Robotics Ltd, Modiin (IL)

(72) Inventors: David Ben-David, Rehovot (IL); Yair Gordin, Modiin (IL)

(*) Notice: Subject to any disclaimer, the term of this patent is extended or adjusted under 35 U.S.C. 154(b) by 61 days.

(21) Appl. No.: 18/315,513

(22) Filed: May 11, 2023

(65) Prior Publication Data

US 2023/0276986 A1     Sep. 7, 2023

Related U.S. Application Data

(62) Division of application No. 17/151,227, filed on Jan. 18, 2021, now abandoned.

(51) Int. Cl.
*A47J 37/06*     (2006.01)
*A47J 27/00*     (2006.01)
(Continued)

(52) U.S. Cl.
CPC ......... *A47J 37/0641* (2013.01); *A47J 27/004* (2013.01); *A47J 36/32* (2013.01); *A47J 36/34* (2013.01)

(58) Field of Classification Search
CPC ........... A47J 27/004; A47J 36/32; A47J 36/34
See application file for complete search history.

(56) References Cited

U.S. PATENT DOCUMENTS

| 10,025,282 | B1* | 7/2018 | Wilkinson | ........... G05B 19/042 |
| 2019/0269159 | A1* | 9/2019 | Reischmann et al. | .. A23L 7/187 |
| 2020/0375405 | A1* | 12/2020 | He | ........................ A47J 44/00 |

FOREIGN PATENT DOCUMENTS

| CN | 2688198 | Y1 * | 3/2005 | ............. A47J 37/12 |
| CN | 207855533 | U1 * | 9/2018 | ............. A47J 27/00 |

(Continued)

OTHER PUBLICATIONS

Machine translation of CN 2688198 Y1 performed on Mar. 26, 2024, Guo (Year: 2005).*

(Continued)

*Primary Examiner* — Dana Ross
*Assistant Examiner* — Kevin Guanhua Wen
(74) *Attorney, Agent, or Firm* — Haim M. Factor—1st-Tech-Ideas.com

(57) ABSTRACT

The present invention is to provide a cooking apparatus to operate in an automated/robotic environment containing 3 major sub-units: air fryer hood, a rotating or a vibrating pot and an induction heating subunit. The air fryer hood of the air fryer subunit streams high velocity, heated air, circulating it in the cooking pot which is rotated, generating a stirring motion of the food ingredients contained in the said pot. The induction unit which is positioned under the rotating pot base may be used to heat the pot for frying and browning of the food products. The apparatus can be used as a stand alone or incorporated in robotic or automated food preparation systems. The apparatus provides controlled cooking regimes for various recipes and food product requirements and each of the sub-units of the apparatus is independently controlled.

9 Claims, 5 Drawing Sheets

(51) Int. Cl.
*A47J 36/32* (2006.01)
*A47J 36/34* (2006.01)

(56) References Cited

FOREIGN PATENT DOCUMENTS

| CN | 111743420 A | * | 10/2020 | ........... A47J 37/0641 |
| JP | 2016503683 A1 | * | 2/2016 | ............ A47J 27/002 |
| WO | WO-2020012262 A1 | * | 1/2020 | ............ A47J 27/004 |

OTHER PUBLICATIONS

Machine translation of CN 111743420 A performed on Mar. 26, 2024, Hu (Year: 2020).*
Machine translation of JP 2016503683 A1 performed on Mar. 26, 2024, Tan et al. (Year: 2016).*
Machine translation of CN 207855533 U1 performed on Jul. 22, 2024, Mai (Year: 2018).*

* cited by examiner

AIR FRYER WITH VIBRATING OR ROTATING POT AND INDUCTION COOKING UNIT FOR ROBOTIC AND AUTOMATED FOOD PREPARATION SYSTEMS

FIELD OF THE INVENTION

The present invention relates to an air fryer that can be integrated in robotic or automated food preparation systems. More so, said invention uses an induction heating system brought forth through circulation of high velocity air current combined with stirring motion generated by a rotating or vibrating cooking pot, to cook food products in a uniform manner and in an optimized time.

BACKGROUND OF THE INVENTION

A wide variety of cooking devices are being used to for meal preparation, such as conventional ovens, induction cookers, microwaves, deep fryers and more. Amongst these air fryers are considered the most advanced form of cooking wherein hot air circulation is deployed around a basket containing food items to be cooked. Such circulation entailed production of a crispy layer on the food as a result of Maillard reaction setting-in.

Furthermore, such hot air circulation allows cooking in a significantly lesser oil utilization to as high as 80 percent saving thereby entailing an edge in healthy cooking over other deep frying cooking options.

Air fryers however suffer from the problem of improper heat distribution resulting in variable level of food cooking. Efforts to minimize such improper heat distribution apart from minimizing oil usage are effectuated through incorporation of various implements/attachments in the air frying system.

Various patents involving various air frying system for optimal cooking are available over quite some time.

US 20190290072 titled, "Hot Air Fryer Cooking Appliance" a hot air fryer cooking appliance includes a hot air blowing system, a vessel and a basket. The basket includes a manipulating handle having a bracket and the vessel including an upper edge and a receiving area for the handle. The bracket bears against the upper edge and the handle is housed in the receiving area when positioning the basket in the vessel. The basket includes on its outer and inner walls a first and a second assembly part, respectively. These assembly parts cooperate and ensure the lateral guiding of the basket when positioning the basket in the vessel until the handle reaches its position in its receiving area and the basket reaches a centered bearing position in the vessel, allowing the bottom of the basket to be kept away from the bottom of the vessel and to be laterally wedged in the vessel.

In U.S. Pat. No. 6,152,023 titled, "Fryer system" talks of a fryer system and a frying process have a continuous through feed operation. On an endless conveyor mechanism for the fryer system, there is arranged a plurality of receiving containers, which can accept frying goods. The receiving containers, which are essentially enclosed, are formed having a fill orifice on an upper face and a closeable drain orifice on an underface. At at least one fill station, a defined amount of a heated frying fluid can be poured through the fill orifice into the receiving containers with the drain orifice closed. At least one drain station the frying fluid can be emptied out of the receiving containers with the drain orifice open. Through the fryer system and its a frying process, the consumption of frying fluid and consumption of energy can be significantly reduced yielding a good frying result.

US20190142220 titled, "Fryer apparatus and method for improved heating control of a cooking chamber of the fryer apparatus" includes a fryer apparatus and method of frying food products includes a cooking chamber, a heater disposed external to the cooking chamber, a fuel system disposed external to the cooking chamber, a blower configured to propel an airflow toward a heater, and a fuel injector configured to inject fuel into the airflow to create an air-fuel mixture. The fuel system is configured to deliver an air-fuel mixture to the heater. The heater is configured to ignite the air-fuel mixture to provide an external heating source for the cooking medium within cooking chamber. The temperature of the cooking medium is controlled by varying the speed of the airflow.

While the mentioned patents talk about various forms of air fryer utilization in fast cooking, none of these talk of mechanism for consistent heating system. Induction heating involves elimination of the inconsistencies and quality issues associated with open flame, torch heating and other methods. Once the system is properly calibrated and set up, there is no guess work or variation; the heating pattern is repeatable and consistent. In a closed loop temperature control system as the air frying, advanced induction heating systems have the capability to measure the temperature of each individual part. The system further optimizes in an automated/robotic environment. The present invention tries to incorporate the same in an air frying system more so, in an automated/robotic environment to enable maximize the cooking cycle.

SUMMARY OF THE INVENTION

An aspect of the present invention is to provide an air frying cooking apparatus for rapid, consistent and even meal or food product preparation, to be used stand alone or incorporated in robotic or automated food preparation systems.

A still further aspect of the invention is to provide a cooking apparatus containing 3 major sub-units: air fryer hood, rotating pot and induction cooker.

Another aspect of the invention is to provide controlled cooking regimes for various recipes and food product requirements.

A still further aspect of the invention is that each one of the sub-units of the apparatus is independently controlled, enabling turning the sub-unit on and off, adjusting the circulated air velocity and temperature, adjusting the induction cooker power levels, adjusting the pot rotational velocity and direction.

A further aspect of the invention is optimization of air temperature, air stream duration and frequency, induction power level, pot rotational velocity, pot rotational direction for a specific recipe resulting in reduction in the meal preparation duration, meal consistency and flavor.

A still further aspect of the invention is that the 3 sub-units of apparatus can be independently activated and controlled, thus, enabling multiple cooking modes, such as but not limited to, cooking with induction only, cooking with air fryer only, stirring only (for recipes such as salads).

Another aspect of the present invention is equipping the induction cooker with a communication port enabling the controller to activate it and adjust the performance parameters, such as but not limited to, power level or temperature level.

A still further aspect of the invention is equipping the induction cooker with integrated temperature sensor for transmitting the rotation pot actual temperature during the cooking process, for enabling real time adjustments in sub-unit's performance parameters, such as but not limited to, power, heated air velocity, pot rotational speed, recipe cooking duration.

Another aspect of the present invention is real-time process control of the recipe preparation.

A still further aspect of the invention is a heating element, positioned in the air fryer hood, which heats a high velocity air stream, generated by a fan which creates a vortex of air flow regime, forcing the air from the environment through the heating element, evenly distributing it within the cooking pot. The fan motor is equipped with an adjustable speed control, which regulates the air flow regime to suite the desired recipe.

A still further aspect of the invention is a pivoted air fryer hood. The air fryer hood, positioned above the rotating cooking pot, is pivoted, thus enabling its full disengagement and access to the cooking pot and the air fryer hood.

A still further aspect of the invention is providing a removable cooking pot which is enabled by the pivoted air fryer mechanism which provides a full access to manually or automatically place and remove the cooking pot from the apparatus. The cooking pot might include a gripping interface, such as but not limited to, a steel ring for gripping by electromagnets. Using various motion systems, such as but not limited to, driven linear guides, robotics arms, pneumatic actuators or electric actuators, the cooking pot can be gripped, removed from the apparatus and replaced by a clean cooking pot. Placing and removing the cooking pot from the apparatus is done by a single line of movement.

A further aspect of the invention is the rotation of the cooking pot for adequate air exchange of air wherein, the rotational motion of the pot, stirs the cooking vessel or cooking pot contents continuously, thereby enabling the heated air stream to impact the entire food ingredients' surface more evenly.

Another aspect of the present invention is the presence of spring-loaded idler wheels which are flexible and increases the placement tolerance requirement thereby enabling both manual and automatic cookware mounting.

A further aspect of the invention is equipping the cooking vessel or the cooking pot to vibrate during the cooking regime, thereby generating a relative motion of the food ingredients within the vessel or the pot, relative to its inner surface which thereby generates a stirring motion between the ingredients.

A further aspect of the invention is the generation and application of the vibration motion and the vibration forces on the removable cooking vessel or the removable cooking pot by an apparatus such as but not limited to, pneumatic drive or pneumatic element, AC or DC electrical motor or electrical rotational drive incorporating and eccentric element, electromagnetic actuator or electrical linear motor, solenoid valve.

In still another aspect of the invention, the cooking vessel or a cooking pot can, which may be removed or replaced or repositioned, and which is to be gripped to the vibration mechanism or a vibration element involves equipping the present apparatus with a mechanism such as but not limited to, a mechanical gripping clamp or a mechanical gripping mechanism, electromagnet, permanent magnet or a pneumatic suction element.

A further aspect of the present apparatus is the provision of the use of cookware of varying texture and surface finishes for cooking since the texture and the surface finish of the cookware have little effect on the tangential friction forces generated by the friction wheels since the spring-loaded idler wheels applies normal forces on the cookware's outer diameter which increases the range of cookware that can be used on the apparatus.

In another aspect of the present invention, the apparatus can be operated stand alone as in prior art or it can also be operated as a subsystem of an automated food preparation apparatus. A series of independent cooking units can be operated and controlled by a processor, adjusting the rotational speed and direction, as well as the power, and other parameters individually. The inclined cooking angle can be individually adjusted as well, manually or automatically, to match the requirements for variety of recipes cooked.

A still further aspect of the invention is the cooking pot's rotational velocity and direction regulation. The rotational velocity of the cooking pot can be predefined or altered and controlled during the cooking process, depending on the recipe requirements.

A still further aspect of the invention is the rotation of the cookware which automates a hand steering motion for even heat dissemination. The rotational movement is generated by an electric motor, invoked by a controller and which receives commands from a processor.

Another aspect of the invention is an integral stirrer of the cooking pot for disturbing the food products within the cooking pot cavity. The pot's inner surface geometry includes a protrusion which acts as a stirrer during the rotational movement, thereby generating a stirring motion.

In another aspect of the present invention, the cooking apparatus provides for an adjustable cooking plane angle which can be inclined for cooking optimization, and controlling the stirring motion of the cooked food ingredients.

A still further aspect of the invention is equipping the air fryer subunit with adjustable motor speed control for regulation of the cooking pot's rotational velocity and direction.

Another aspect of the invention is interchangeable cooking vessels or cooking pots enabling cooking of various recipes using various cooking vessel types. The vessel or the cooking pot may be made of materials such as but not limited to, aluminum, steel, copper, plastic, suitable for various operational modes of the apparatus.

A further aspect of the invention is that the vessel or the cooking pot may be made of materials such as but not limited to, aluminum, steel, copper, plastic, suitable for various operational modes of the apparatus.

A still further aspect of the invention is that the cooking vessel or cooking pot may be manufactured using various manufacturing technologies, such as but not limited to, aluminum casting, sand casting, iron casting, aluminum rolling, stamping, machining, extrusion.

A further aspect of the invention is maintaining a parallel alignment of the flat cookware base with the induction element for sustaining heat efficiency in the entire cooking process.

A still further aspect of the invention is maintenance of a distance between the cookware flat base and the induction element which can be preadjusted and sustained during the rotational movement of the cookware in the cooking process.

REFERENCE NUMERALS

Figure 1:
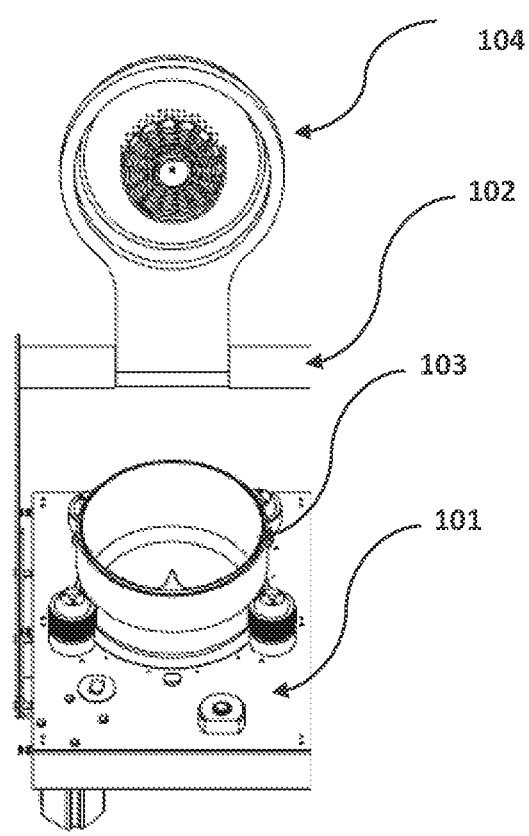
FIG. 1 is the front view of the air fryer hood sub-unit of the apparatus in a disengaged position.

101 Induction sub-unit, pot rotation sub-unit
102 Air fryer sub-unit
103 Cooking vessel, cooking pot, rotating cooking pot
104 Air fryer hood
201 Induction heater element
202 Spring-loaded idler, pot rotation mechanism
203 Apparatus static base
204 Pot rotation mechanism driving friction wheels
205 Incline adjustment pivot
206 Pot rotation mechanism driving belt, timing belt
301 Air fryer heating element
302 Air fryer fan blade
303 Air fryer fan motor
401 Cooking vessel or cooking pot gripping mechanism
402 Vibration mechanism
501 Cooking vessel or cooking pot gripping mechanism—side view

DESCRIPTION OF THE PREFERRED EMBODIMENTS

The present invention provides an air frying cooking apparatus for rapid, consistent and even meal or food product preparation, to be used stand alone or incorporated in robotic or automated food preparation systems.

Figure 2:
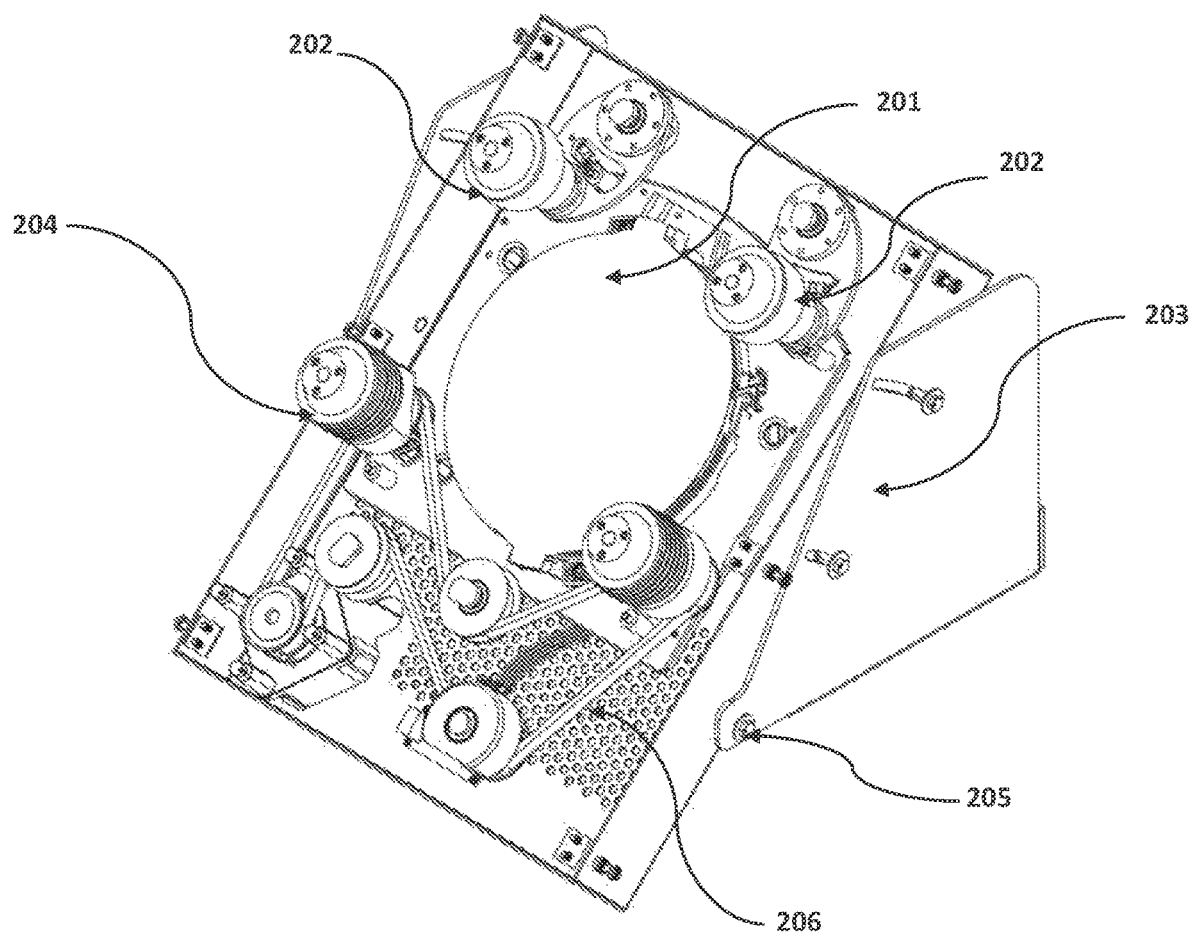
FIG. 2 is the detailed view of the induction sub-unit and the pot rotation mechanism of the present invention.
Figure 3:
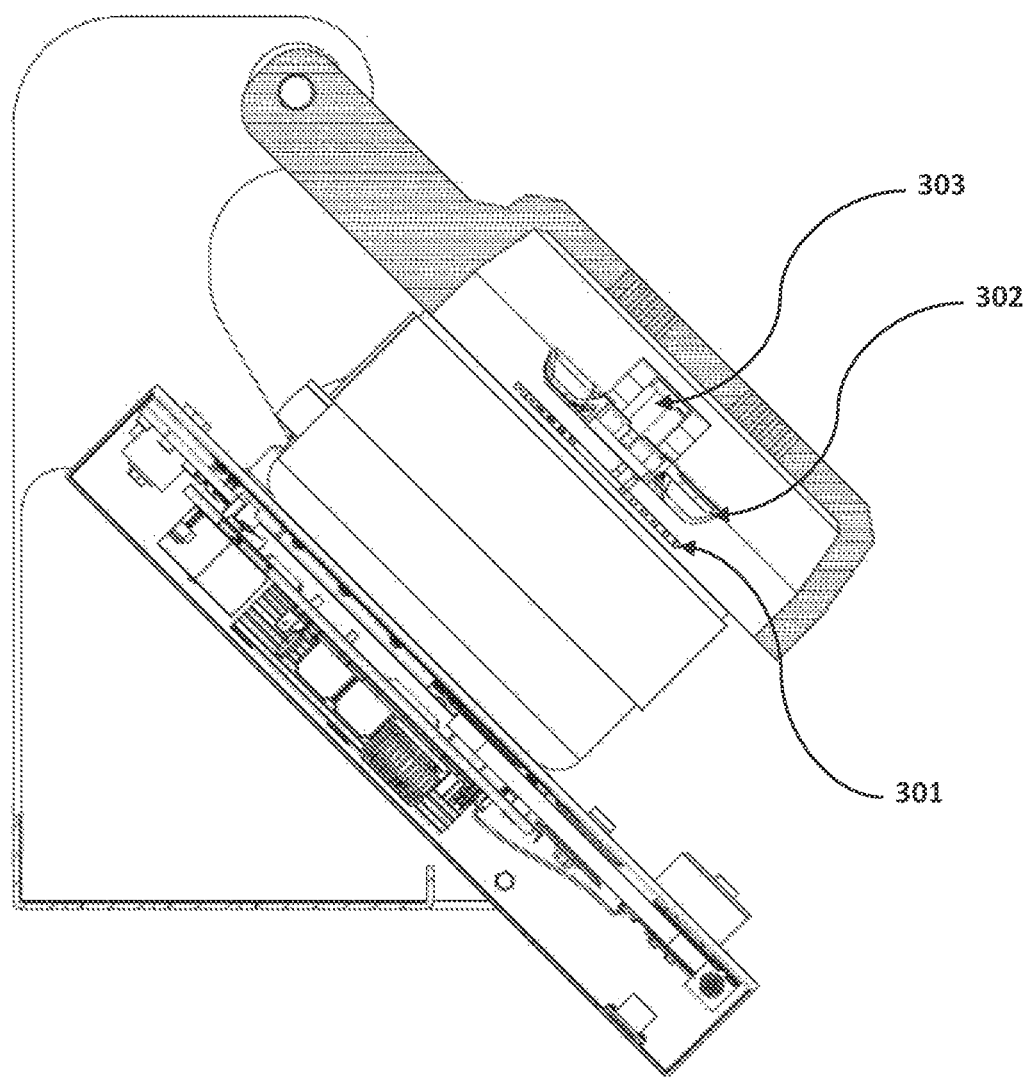
FIG. 3 is the sectional view of the air fryer hood sub-unit of the apparatus in an engaged position.

Referring to FIGS. 1 to 3, the cooking apparatus of the present invention comprises 3 major sub-units:

Induction subunit 101;
air fryer subunit 102; and
rotating or vibrating cooking pot subunit 103.

The air fryer hood 104 of the said air fryer subunit 102 streams high velocity, heated air, circulating it in the said cooking pot 103 which is rotated, generating a stirring motion of the food ingredients contained in the said pot. The induction unit 101 which is positioned under the rotating pot base 103 may be used to heat the pot for frying and browning of the food products.

Referring further to FIG. 2, the rotation of the cookware automates a hand steering motion for even heat dissemination through an automatic process. The rotational movement is generated by an electric motor, invoked by a controller which receives commands from a processor. The mechanism involves transferring power from the electric motor via a timing belt 206 through a series of pulleys to friction wheels 204. Since the outer diameter of the friction wheels 204 are made of heat resistant high friction material, it transfers the tangential friction force to the cookware. Also, since the outer diameter of the friction wheels 204, are pressed against the outer diameter of the cookware, it generates the required tangential force to rotate it. The pressure required is applied by spring loaded idler wheels 202, across the center of the cookware. Further, the normal force essential for generating the tangential friction forces is applied by the spring-loaded idler wheels 202, mounted across the cookware.

The air fryer sub unit 102 of the present invention comprises a heating element 301 positioned in the air fryer hood 104, which heats a high velocity air stream, generated by a fan 302 which is driven by a fan motor 303 which creates a vortex of air flow regime, forcing the air from the environment through the heating element 301, evenly distributing it within the cooking pot 103. The fan motor 303 is equipped with an adjustable speed control, which regulates the air flow regime to suite the desired recipe.

The heating element 301 is an open coil, resistance wire type, and is thermostatically regulated to maintain cooking temperatures ranging from 150 to 450 degrees F. The fan creates a vortex air flow regime, forcing the air from the environment through the heating element 301, evenly distributing it within the cooking pot 103. Fan motor 303 is equipped with an adjustable speed control, regulating the air flow regime. The air velocity might exceed 1000 feet per minute. e.g., 2600 feet per minute to suite the desired recipe.

In an embodiment of the present invention the air fryer hood 104, positioned above the rotating cooking pot 103, is pivoted, which enables its full disengagement and access to the cooking pot 103 and the air fryer hood 104. The rotational motion around the pivot might be used as a switching mechanism, disabling or shutting down the apparatus or its sub-units, when disengaged or opened. The rotational engage/disengage motion might be generated by an electrical motor, pneumatic actuator or other motion elements, invoked by a controller and which receives commands from a processor.

Referring further to FIG. 2, in some embodiments of the present invention, the apparatus is provided with induction heating unit as another subunit, which generates a magnetic field, thus heating the rotating pot. The induction unit might be 1000 W, e.g., 2000 W or more. The induction heating unit is equipped with a communication port enabling the controller to activate it and adjust the performance parameters, such as but not limited to, power level or temperature level.

In some embodiments the induction heating unit might be equipped with integrated temperature sensor, for transmitting the rotating pot's actual temperature during the cooking process, thereby enabling real time adjustments in sub-unit's performance parameters, such as but not limited to, power, heated air velocity, pot rotational speed, recipe cooking duration.

In some embodiments of the present invention, for maintaining the heating efficiency in the entire cooking process and to avoid a rapid drop of the magnetic field generated by the induction element, the flat base of the cookware is maintained parallel to the induction element. This is achieved by positioning a round element attached to the cookware, which serves as a datum for sustaining the distance between the cookware flat base and the induction element, which enables use of a range of depths of the cookware.

Further, the distance between the cookware flat base and the induction element can be preadjusted and sustained during the rotational movement, preventing the drop of the magnetic field and maintaining the heating efficiency. The maintenance of gap between the induction element ceramic glass and the cookware flat base is also important for avoiding friction and wear. The maintenance of the gap also allows a range of cookware having varying depths and diameter to be used for induction cooking.

In the apparatus of the present invention each of the sub-units of the apparatus is independently controlled, enabling turning on and off the sub-unit, adjusting the circulated air, velocity and temperature, adjusting the pot's rotational velocity and direction.

As mentioned earlier, the rotation of the cooking pot for adequate air exchange is another feature of the present invention. In applications, where the cooking vessel or a cooking pot is static, the high velocity heated air impacts the top surface of the food ingredients, thus resulting in uneven heat distribution. In the present invention, the rotational motion of the pot, stirs the cooking vessel or cooking pot contents continuously. Therefore, enabling the heated air stream to impact the entire food ingredients' surface more evenly and ensures even heating of the food ingredients in the cooking pot.

The cooking pot's rotational velocity and direction regulation is achieved by equipping the air fryer sub-unit with adjustable motor speed control, enabling velocity adjustment per recipe. The rotational velocity of the cooking pot can be predefined or altered and controlled during the cooking process, depending on the recipe requirements. The direction of the rotation can also be predefined or altered during the cooking process by changing the rotational velocity and direction enabled programming of a cooking regime, specific for a recipe. This is achieved by the controller of the apparatus which invokes the motor with the desired speed. The controller itself receives precise commands from the processor with regards to the rotational speed and direction to be maintained depending upon the type of cookware, the ingredients and the recipe to be cooked, the inputs of which is received by the processor.

In some embodiments of the present invention, the apparatus is provided with a removable cooking pot which is enabled by the pivoted air fryer mechanism which provides full access to manually or automatically place and remove the cooking pot from the apparatus. The cooking pot might include a gripping interface, such as but not limited to, a steel ring for gripping by electromagnets. Using various motion systems, such as but not limited to, driven linear guides, robotics arms, pneumatic actuators or electric actuators, the cooking pot can be gripped and removed from the apparatus and replaced by a clean cooking pot. Placing and removing the cooking pot from the apparatus is done by a single line of movement.

Figure 4:
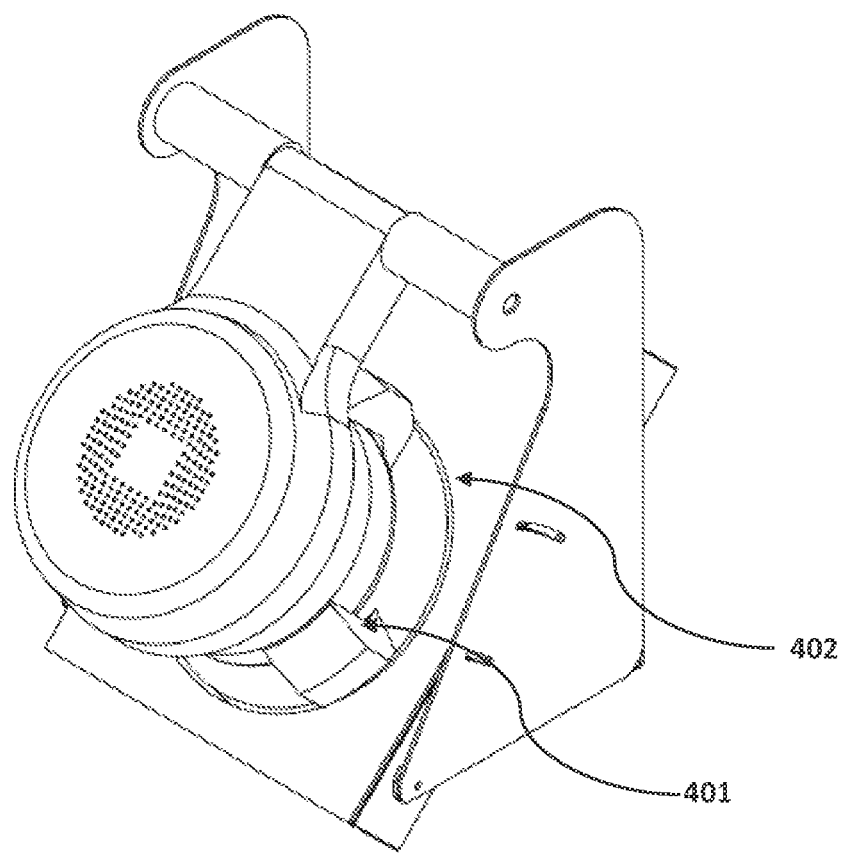
FIG. 4 is an isometric view of the apparatus incorporating a vibration mechanism.
Figure 5:
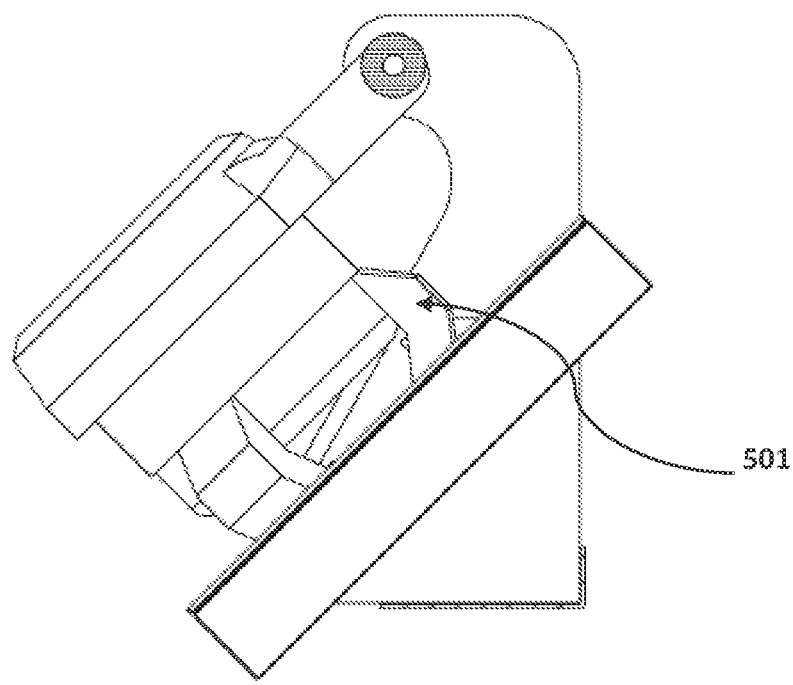
FIG. 5 is a cross section view of the apparatus incorporating a vibration mechanism.

Referring to FIGS. 4 and 5, in some embodiments of the present invention, the cooking vessel or the cooking pot is equipped to vibrate during the cooking regime, thereby generating a relative motion of the food ingredients within the vessel or the pot, relative to its inner surface. The vibration, further, generates a stirring motion, disturbing the food ingredients and creating a relative motion between the ingredients.

The vibration motion and the vibration forces may be generated and applied on the removable cooking vessel or the removable cooking pot by an apparatus such as but not limited to, pneumatic drive or pneumatic element. AC or DC electrical motor or electrical rotational drive incorporating and eccentric element, electromagnetic actuator or electrical linear motor, solenoid valve.

Further, it is to be noted that the cooking vessel or a cooking pot can, which can be removed or replaced or repositioned, and which is to be gripped to the vibration mechanism or a vibration element involves equipping the present apparatus with a mechanism such as but not limited to, a mechanical gripping clamp or a mechanical gripping mechanism, electromagnet, permanent magnet, pneumatic suction element. The contact point of the gripping mechanism with the cooking vessel or the cooking pot may be insulated to temperatures of 100° F. or 300° F. or 450° F. or 600° F. which might be achieved by incorporating a layer of materials such as but not limited to, silicone, Viton, ceramics—such as alumina or zirconia, cork, between the cooking vessel or the cooking pot heated surface and the gripping mechanism.

The vibration motion characteristics, such as but not limited to, vibration motion frequency and the vibration motion amplitude might be controlled, adjusted and altered as a function of system parameters, such as but not limited to, system size, cooking vessel or cooking pot size and geometry, cooking vessel or cooking pot weight, amount and weight of the food ingredients, cooking duration and temperature, recipe and cooking regime.

In the present apparatus, a vibration profile can be set. The vibration profile may be defined as the change in vibration motion characteristics, such as but not limited to, vibration motion frequency and vibration motion amplitude vs. the cooking or operating cycle duration or cooking time or system operating time.

The vibration motion amplitude and frequency might be preset, adjusted before or during the cooking cycle, turned on and off during the cooking cycle or altered during the cooking cycle. The vibration motion frequency and amplitude might be controlled, turned on and off, altered or adjusted depending on the cooking modes. For example, a specific recipe, requiring a predefined, specific air temperature regime, which alters during the cooking cycle, might require a specific vibration motion frequency profile, altering the vibration motion frequency vs. the air temperature fluctuation. The vibration frequencies might be, but not limited to 1 Hz or 10 Hz or 100 Hz or 1000 Hz. The vibration amplitudes might be, but not limited to 0.1 mm or 1 mm or 10 mm or 20 mm. For example, a pasta recipe might require low frequency and high amplitude vibration motion, such as 5 Hz frequency and 10 mm amplitudes, while a salad recipe might not require any vibration motion at all, turning the vibration off. Another example would be a French fries recipe, which would require a 10 Hz frequency and 2 mm amplitude, for example, for the first 30% of the cooking cycle duration and 10 Hz frequency and 5 mm amplitude of the vibration motion during the rest 70% of the cooking cycle. Another example would be a salad recipe, which requires stirring motion without heating. In this example the vibration movement will be generated without or regardless the air fryer operation.

The vibration generating element or the vibration generating mechanism is invoked by the controller which receives commands from a system PC or robotic or automated system PC or a system cloud server. The controller receives feedback from the vibration generating element or a vibration generating drive or a vibration generating mechanism regarding the recipe requirement. The controller sets the vibration movement parameters, such as but not limited to, vibration frequency, vibration amplitude, vibration duration according to the received inputs of the recipe requirement. The controller also, invokes the cooking vessel or the cooking pot gripping mechanism, gripping or releasing the pot when positioned in place, removed or adjusted depending upon the requirements of the recipe and the settings of the cooking modes.

In some embodiments of the present invention the cookware can be mounted on the apparatus both manually and automatically which is achieved by the presence of spring-loaded idler wheels which are flexible and increases the placement tolerance requirement thereby enabling both manual and automatic cookware mounting. The spring-loaded idler wheels enables simple mounting and dismounting of the cookware, either manually or automatically, by a single line of movement. Since, spring loaded idler wheels tolerate a predefined amount of positioning error, thereby easing the manual mounting operation or motion precision requirements from the peripheral subsystems.

The cookware may be mounted by a single directional linear motion, generated manually by hand or automatically by a motion mechanism. Such motion mechanism might be a motor driven linear motion guide, gripping the cookware, or a pneumatic drive, or a pneumatic piston, or a linear motor, or any other component generating a linear motion. The above-described mechanism is capable of positioning the cookware precisely and perpendicularly to the induction ceramic glass and performs a linear motion, while maintaining a real time position control. The mechanism positions the cookware in a predefined position.

In some embodiments the cooking pot is provided with an integral stirrer for disturbing the food products within the cooking pot cavity. The pot's inner surface geometry includes a protrusion which acts as a stirrer during the rotational movement, thereby generating a stirring motion. The protrusion geometry can vary, depending on constrains such as but not limited to, the scale of the apparatus, the recipe the surrounding robotic system requirements and limitations. The stirrer protrudes inwards 5 mm e.g., 10 mm e.g., 40 mm e.g., 60 mm. The protrusion cross-section might be trapezoidal, triangular or rectangular.

In some embodiments, the cooking apparatus of the present invention provides for an adjustable cooking plane angle. The cooking plane can be inclined for cooking optimization, and controlling the stirring motion of the cooked food ingredients. The incline is achieved by mounting the apparatus on a static base, having a rotational pivot. The inclined angle might be limited, thus predefining the incline angle range. The incline angle can be preadjusted or changed manually, or preadjusted and controlled by a drive, such as but not limited to, electrical motor drive, pneumatic drive, electric actuator.

The present invention provides controlled cooking regimes for various recipes and food product requirements. The apparatus of the present invention optimizes the controlled parameters, for a specific recipe which includes but is not limited to, air temperature, air stream duration and frequency, pot's rotational velocity and direction which may be optimized for a specific recipe. Optimization of the above parameters might result in reduction in the meal preparation duration, meal consistency and flavor.

In some embodiments of the present invention, the apparatus allows cookware of varying texture and surface finishes to be used for cooking since the texture and the surface finish of the cookware have little effect on the tangential friction forces generated by the friction wheels as the spring-loaded idler wheels applies normal forces on the cookware's outer diameter which increases the range of cookware that can be used on the apparatus.

In some embodiments, the apparatus can be operated stand alone as in prior art or it can also be operated as a subsystem of an automated food preparation apparatus. A series of independent cooking units can be operated and controlled by a processor, adjusting the rotational speed and direction, as well as the power, and other parameters individually. Further, the inclined cooking angle can also be individually adjusted as well, manually or automatically, to match the requirements for variety of recipes cooked.

In embodiments of the present invention, each one of the sub-units of the apparatus is independently controlled, which enables turning each of the sub-unit on and off, adjusting the circulated air velocity and temperature, adjusting the induction cooker power levels as well as adjusting the pot's rotational velocity and direction.

Further, the apparatus provides controlled cooking regimes for various recipes and food product requirements. Thus for a specific recipe, the controlled parameters, such as but not limited to, air temperature, air stream duration and frequency, induction power level, pot's rotational velocity, pot rotational direction might be optimized which might result in reduction in the meal preparation duration, meal consistency and flavor.

In some embodiments of the present invention, different cooking modes can be selected. The 3 sub-units of the apparatus can be independently activated and controlled, thus, enabling multiple cooking modes, such as but not limited to, cooking with induction only, cooking with air fryer only, stirring only (for recipes such as salads). The operational modes may be a combination of activated sub-unit, such as induction cooker and stirring, air fryer combined with induction unit and stirring. Operational mode can be defined by an activation sequence of each one of the sub-units, such as but not limited to, activation of the air fryer for a defined duration following activation of the stirring for a defined duration. Operational mode can be set or defined by altering the performance parameters of each one of the sub-units during the cooking process, for example activating the air fryer sub-unit along with stirring while the stirring velocity and direction is recipe decedent, altering during the cooking process.

In some embodiments of the present invention the recipe preparation process is controlled real-time. Since each one of the apparatus sub-units returns feedbacks to the controller, such as but not limited to, pot presence and pot temperature, the PC reading the feedback data from the controller adjusts the relevant process parameters for precise process control of the recipe preparation.

The above process can be explained through an example. If the pot temperature exceeds a nominal value required by the specific recipe, power levels of the relevant sub-units will be reduced. Another example would be validation of the pot presence. In case the apparatus is incorporated in robotic or automatic food preparation system, including a pot handling and transportation mechanism, the pot placement to the apparatus might fail. The feedback from the apparatus can be used to verify or diagnose pot presence and indicate a success or failure for pot handling operations.

Referring to FIG. 2 An embodiment of the present apparatus comprises of spring-loaded idler wheels which are flexible and increases the placement tolerance requirement which enables both manual and automatic cookware mounting. The cookware may be mounted by a single directional linear motion, generated manually by hand or automatically by a motion mechanism. Such motion mechanism might be a motor driven linear motion guide, gripping the cookware, or a pneumatic drive, or a pneumatic piston, or a linear motor, or any other component generating a linear motion. The above-described mechanism will be capable of positioning the cookware in a predefined position, precisely and perpendicularly to the induction ceramic glass and performing a linear motion, while maintaining a real time position control.

In some embodiments of the present invention the cooking vessels or the cooking pots are interchangeable which enables cooking various recipes using various cooking vessel types. For example if the cooking pot is induction compatible, the modes of operation including the induction sub-unit activation and control is enabled.

Further, in some embodiments the vessel or the cooking pot may be made of materials such as but not limited to, aluminum, steel, copper, plastic, suitable for various operational modes of the apparatus. Cooking vessel or cooking pot may be custom manufactured or standard of the shelf item, fitting the geometry constrains of the apparatus, such as outer diameter, inertia, weight, height. The cooking vessel or cooking pot may be manufactured using various manufacturing technologies, such as but not limited to, aluminum casting, sand casting, iron casting, aluminum rolling, stamping, machining and extrusion.

The present disclosed subject matter may be a system, a method, and/or a computer program product. The computer program product may include a computer readable storage medium (or media) having computer readable program instructions thereon for causing a processor to carry out aspects of the present disclosed subject matter. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosed subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosed subject matter. Aspects of the present disclosed subject matter are described herein with reference to flowchart illustrations and/or block diagrams of methods, apparatus (systems), and computer program products according to embodiments of the disclosed subject matter. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosed subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosed subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosed subject matter has been presented for purposes of illustration and description, but is not intended to be exhaustive or limited to the disclosed subject matter in the form disclosed. Many modifications and variations will be apparent to those of ordinary skill in the art without departing from the scope and spirit of the disclosed subject matter. The embodiment was chosen and described in order to best explain the principles of the disclosed subject matter and the practical application, and to enable others of ordinary skill in the art to understand the disclosed subject matter for various embodiments with various modifications as are suited to the particular use contemplated.

The invention claimed is:

1. A method of vibrating cookware during a cooking process having a cooking cycle and a cooking mode in a cooking apparatus having a rotating pot, a pivoted air frying hood positioned above the rotating pot, the rotating pot having a rim, and an induction cooker positioned beneath the rotating pot, the pivoted air frying hood being attached to the rim of the rotating pot wherein the rotating pot is not completely enclosed by the pivoted air frying hood, the induction cooker having induction power levels, the apparatus having a vibration generating mechanism, the cooking apparatus having recipe requirements, the method comprising the steps of:

a. configuring a controller to control a vibration generating mechanism, the controller receiving commands from a system PC;
    b. providing feedback to the controller from the vibration generating mechanism according to the recipe requirements;
    c. configuring the controller to set vibration parameters depending on the recipe requirements and to adjust the power levels of the induction cooker; and
    d. invoking a gripping mechanism of the rotating pot based on the recipe requirements;

whereby the vibration parameters include: vibration frequency, vibration amplitude, and vibration duration;

the rotating pot is vibrated by the vibration generating mechanism and a motion mechanism includes: a motor driven linear motion guide, a pneumatic drive, a pneumatic piston, and a linear motor;

the vibration parameters of a recipe, including respective vibration frequencies and amplitudes, are determined by the cooking mode; and whereby the vibration frequencies range from 100 Hz to 1000 Hz.

2. The method of claim 1, whereby the system includes a mechanical gripping clamp and an electromagnet, which enable removing, repositioning and replacing the rotating pot in the apparatus.

3. The method of claim 2, whereby the mechanical gripping clamp is insulated at a contact point of mechanical gripping to temperatures ranging between 100° F. to 600° F.

4. The method of claim 1, whereby an insulation material includes at least one chosen from the list including: silicone, viton, ceramics, and cork.

5. The method of claim 1, whereby adjusting the vibration parameters is preset before the cooking cycle.

6. The method of claim 1, whereby adjusting the vibration parameters is performed during the cooking cycle.

7. The method of claim 6, whereby adjusting the vibration parameters during the cooking cycle is by turning off the vibration generating mechanism.

8. The method of claim 6, whereby adjusting the vibration parameters during the cooking cycle is by turning on the vibration generating mechanism.

9. The method of claim 1, whereby the vibration amplitude ranges from 0.1 mm to 20 mm.

\* \* \* \* \*